United States Patent
Le Docte et al.

(10) Patent No.: US 6,804,947 B2
(45) Date of Patent: Oct. 19, 2004

(54) DEVICE FOR COOLING THE COMMON NOZZLE OF A TURBOJET POD

(75) Inventors: Thierry Le Docte, Gainneville (FR); Laurent Vicogne, Rolleville (FR)

(73) Assignee: Hurel Hispano, Harfleur (FR)

( * ) Notice: Subject to any disclaimer, the term of this patent is extended or adjusted under 35 U.S.C. 154(b) by 74 days.

(21) Appl. No.: 10/331,643

(22) Filed: Dec. 31, 2002

(65) Prior Publication Data

US 2003/0140615 A1 Jul. 31, 2003

(30) Foreign Application Priority Data

Jan. 10, 2002 (FR) .............................. 02 00234

(51) Int. Cl.$^7$ .............................. F02K 3/02; F02K 1/32
(52) U.S. Cl. ................... 60/226.2; 60/265; 239/127.3; 239/265.17
(58) Field of Search ............. 60/226.1, 226.2, 60/265, 266, 262; 239/127.3, 265.17

(56) References Cited

U.S. PATENT DOCUMENTS 3,514,955 A * 6/1970 Judge et al. ................ 60/262
3,612,402 A * 10/1971 Timms et al. ............. 239/127.3
3,826,088 A    7/1974 Nash er al.
3,837,411 A    9/1974 Nash et al.
4,093,122 A * 6/1978 Linderman et al. ....... 239/127.3
4,815,281 A * 3/1989 Gely ........................ 60/226.2

FOREIGN PATENT DOCUMENTS

FR    2 593 237    7/1987
FR    2 717 859    9/1995
GB    1 258 331    12/1971

* cited by examiner

*Primary Examiner*—Michael Koczo
(74) *Attorney, Agent, or Firm*—Oblon, Spivak, McClelland, Maier & Neustadt, P.C.

(57) ABSTRACT

The invention relates to a dual flow turbojet comprising an engine of axis X housed completely inside a tubular pod whose inside wall co-operates with the case of said engine to define an annular passage for a secondary flow delivered by a fan, said pod having an air inlet upstream of the engine, thrust-reverser means in its middle section, and a common nozzle for ejecting both the primary flow and the secondary flow, the outlet of the nozzle being situated downstream from the engine, said thrust-reverser means being suitable for taking up an active position in which the secondary flow is diverted outwards and forwards from said pod, said nozzle having an enclosure defined by the inside and outside walls of said nozzle.

8 Claims, 10 Drawing Sheets

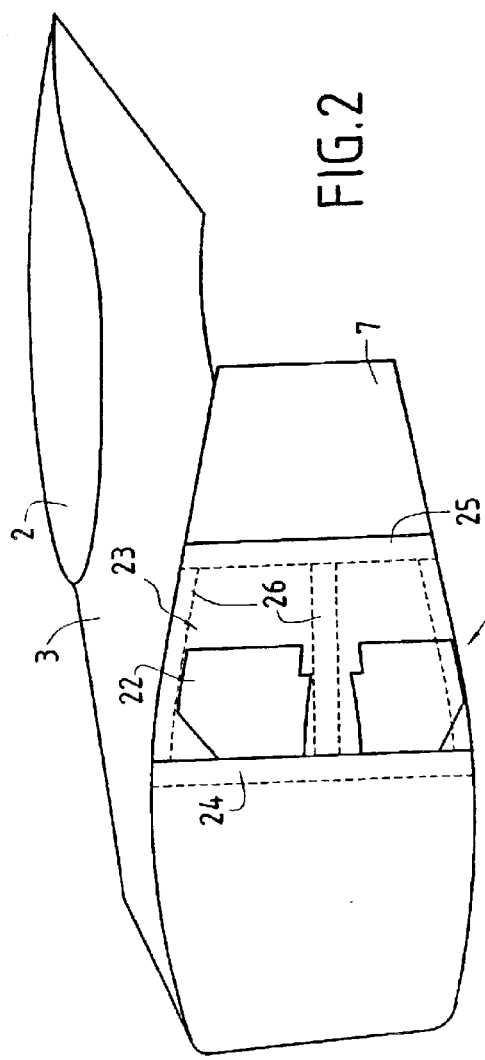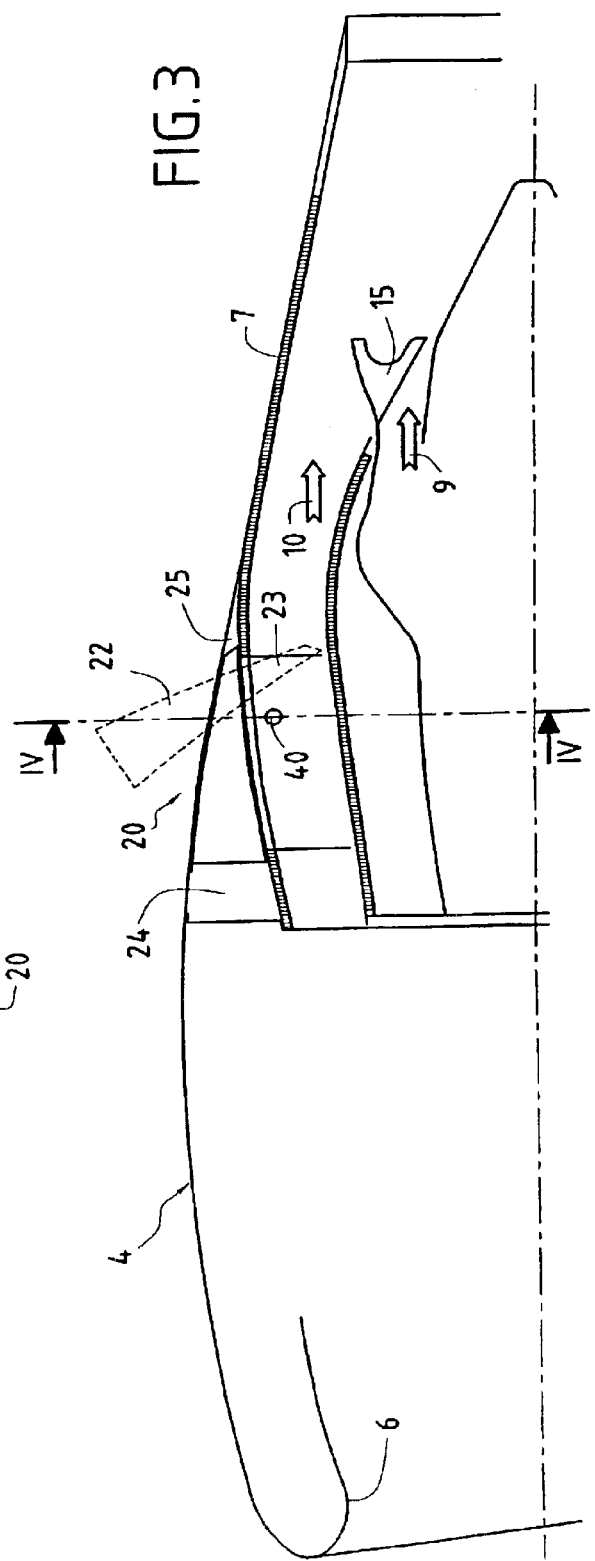

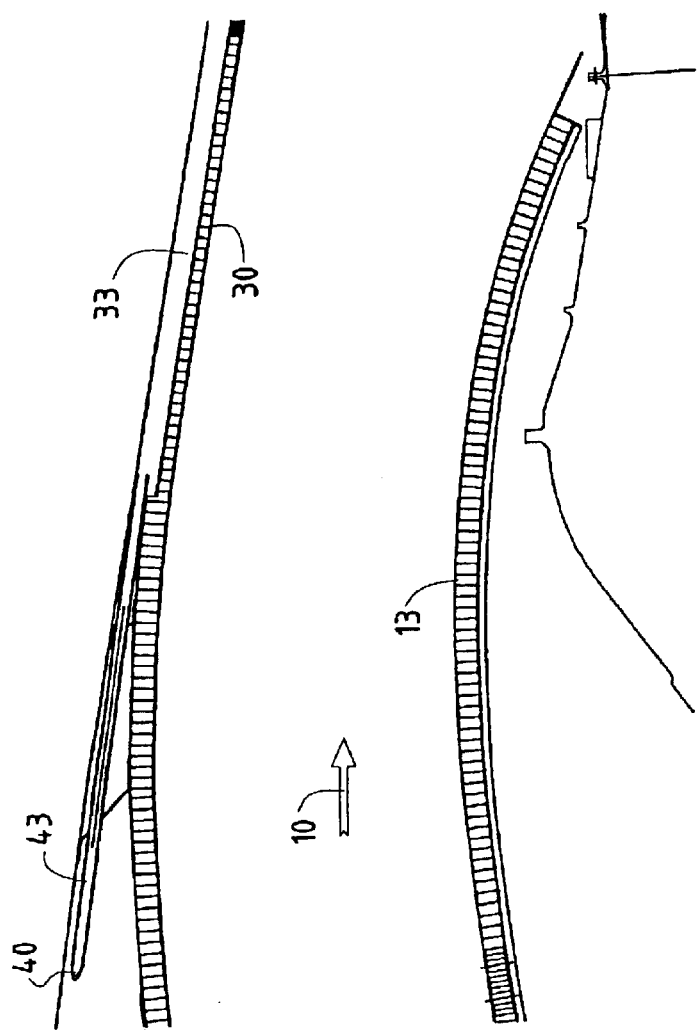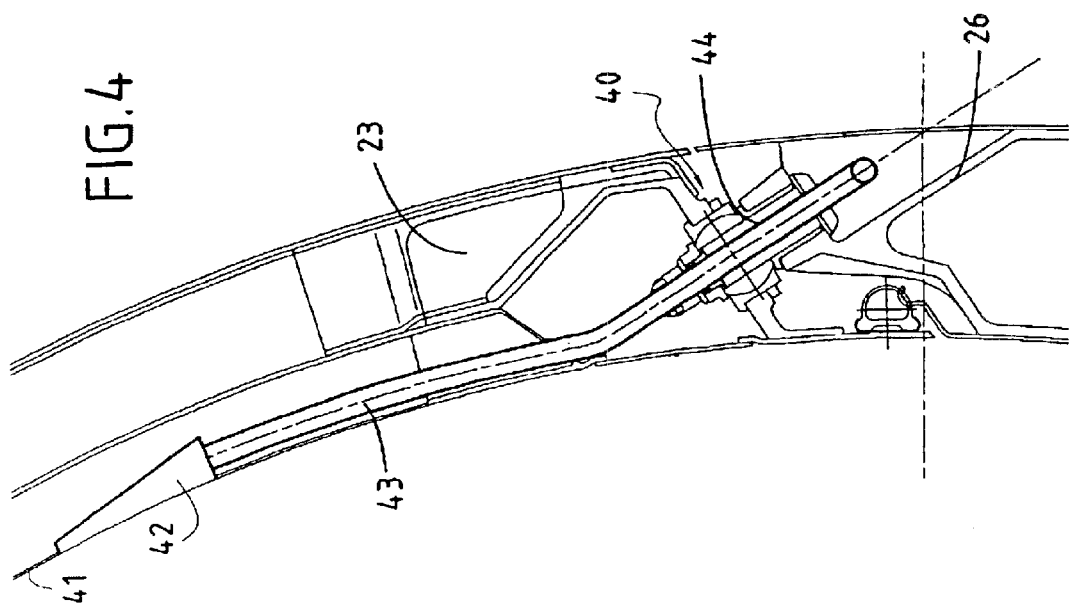

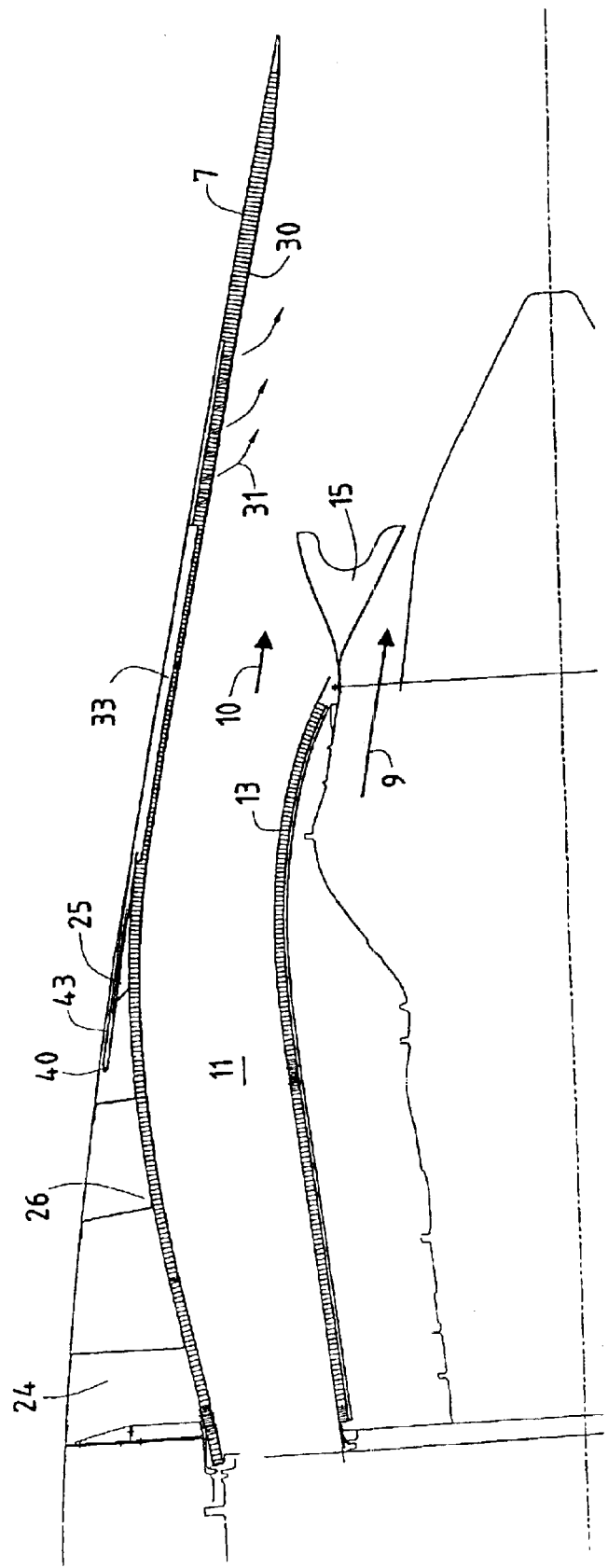

DEVICE FOR COOLING THE COMMON NOZZLE OF A TURBOJET POD

The invention relates to the field of dual flow turbojets fitted to subsonic aircraft and including a long pod terminated by a common nozzle for ejecting both the primary flow and the secondary flow.

FIELD OF THE INVENTION

More precisely, the invention relates to a turbojet of axis X housed completely inside a tubular pod whose inside wall co-operates with the case of said engine to define an annular passage for a secondary flow delivered by a fan, said pod having an air inlet upstream of the engine, thrust-reverser means in its middle section, and a common nozzle for ejecting both the primary flow and the secondary flow, the outlet of the nozzle being situated downstream from the engine, said thrust-reverser means being suitable for taking up an active position in which the secondary flow is diverted outwards and forwards from said pod, said nozzle having an enclosure defined by the inside and outside walls of said nozzle.

BACKGROUND OF THE INVENTION

The downstream end of the engine case which lies between the hot primary flow stream and the cold secondary flow stream is fitted with a mixer for the purpose of accelerating mixing of the hot and cold flows so as to reduce the speed of the gases ejected via the common nozzle, thereby improving propulsive efficiency and reducing the noise of the jet.

Under cruising conditions or at full throttle, the thrust-reverser means are inoperative. The entire flow of air traveling in the secondary stream is ejected by the common nozzle together with the hot gases of the primary flow, and the inside wall of the nozzle is wiped by cold air. This mode of operation is referred to as "forward jet" mode.

In contrast, in "reversed jet" mode, the thrust-reverser means shut off the secondary stream, and the secondary flow is diverted outwards and forwards from the pod, with only the hot gases of the primary stream passing through the ejection nozzle. The nozzle is then subjected to high temperatures. "Reversed jet" mode is used only for braking the aircraft after it has landed, and in order to brake the aircraft effectively, it is necessary for the turbojet to deliver high power, thereby increasing the intensity and the temperature of the hot flow ejected by the nozzle. That is why the common nozzle must be made of a material that withstands the temperature of the hot flow on its own, such as titanium, thereby increasing both its mass and its cost.

U.S. Pat. No. 3,826,088 relates to a turbojet for military use, that is not fitted with thrust-reverser means. The nozzle of that turbojet surrounds a jacket for thermally protected a post-combustion chamber, and it co-operates therewith to define an annular channel that is continuously fed by a fraction of the cold flow. The jacket has slots that continuously deliver a film of air to its inside face. The jacket is clearly not a structural element of the nozzle since it must be capable of expanding freely as a function of temperature variations inside the post-combustion chamber.

FR 2 593 237 discloses a device for bleeding air from the cold flow of a dual flow engine with a thrust-reverser, the air that is bled off being used for cooling, for pressurizing, or for ventilating the airplane. However that document does not mention or suggest cooling the nozzle in "reversed jet" mode of operation in a dual flow turbojet.

OBJECT AND SUMMARY OF THE INVENTION

The object of the invention is to propose a turbojet as specified in the introduction in which the ejection nozzle can be made of a material of lower density.

According to the invention, the object is achieved by the fact that the proposed turbojet further comprises cooling means for cooling the nozzle when the thrust-reverser means are in the active position, said cooling means comprising means for bleeding a flow of cooling air from the secondary flow upstream from the thrust-reverser means, means for taking the bled-off flow of air into the enclosure of said nozzle, and means for forming a film of cooling air on the inside face of said nozzle.

The invention thus makes use of the pressure difference between the upstream and downstream sides of the thrust-reverser means in "reversed jet" mode to drive a flow of air bled off into the cooling device. The higher pressure in the secondary flow upstream from the thrust-reverser means comes from the rotation of the fan and from the air which penetrates into the air inlet of the turbojet under the effect of the speed of the airplane. The lower pressure downstream from the thrust-reverser means comes from the suction effect in the common nozzle, likewise under the effect of the speed of the airplane.

Because the invention ensures the nozzle is cooled when in "reversed jet" mode, the nozzle can be made out of a material that is of lower density and of reduced cost.

Advantageously, the means for forming a film of air on the inside face of said nozzle comprise multiple perforations formed through the inside wall of said nozzle.

In a first embodiment of the invention, the flow of cooling air is bled from the secondary flow by means of at least one scoop.

When the thrust-reverser means comprise at least one door mounted to tilt on longitudinal beams of the pod by means of support pivots, and in a first embodiment of the invention, the scoop is provided on the inside face of the door and the means for bringing the bled-off flow of air into the enclosure of the nozzle comprise a duct connecting the scoop to said enclosure via a bore provided axially in a support pivot for said door.

In a second embodiment of the invention, the scoop is provided on the inside face of a longitudinal beam upstream from the support pivot, and the means for bringing the bled-off flow of air into the enclosure of the nozzle comprise a duct connecting the scoop to said enclosure.

When the thrust-reverser means comprise fixed grids suitable for being masked by axially-movable shutters, and tilting flaps suitable for deflecting the secondary flow towards the grids when in the deployed position, the scoop is provided on the engine case upstream from the flaps in the deployed position, and the means for bringing the bled-off flow of air into the nozzle enclosure comprise a duct connecting the scoop to said enclosure via a radial arm connecting the nozzle to the engine case.

In any event, the shape and position of the scoop are designed so that the scoop does not excessively disturb the secondary flow in "forward jet" mode, and in such a manner that in "reversed jet" mode the pressure of the air in the scoop is sufficient to ensure that air is bled-off at a flow rate that is sufficient to cool the nozzle.

In a second embodiment of the invention, the flow of cooling air is bled from the engine at a valve for regulating the device for controlling turbine clearance, and the means for bringing the bled-off flow of air into the enclosure of the nozzle comprise a duct connecting said valve to said enclosure via a radial arm connecting the nozzle to the engine case.

BRIEF DESCRIPTION OF THE DRAWINGS

Other characteristics and advantages of the invention appear on reading the following description made by way of example and with reference to the accompanying drawings, in which:

FIG. 2 is a side view of a turbojet fitted with a door reverser;

FIG. 3 is a longitudinal half-section of the FIG. 2 turbojet in the plane of symmetry of a door;

FIG. 4 is a cross-section on line IV—IV of FIG. 3 showing a first embodiment of the invention;

FIG. 5 is a half-section of the FIG. 2 turbojet in the plane of symmetry of a door supporting a beam;

FIG. 6 is on a larger scale and shows the air feed duct installed in the beam;

MORE DETAILED DESCRIPTION

Figure 1:
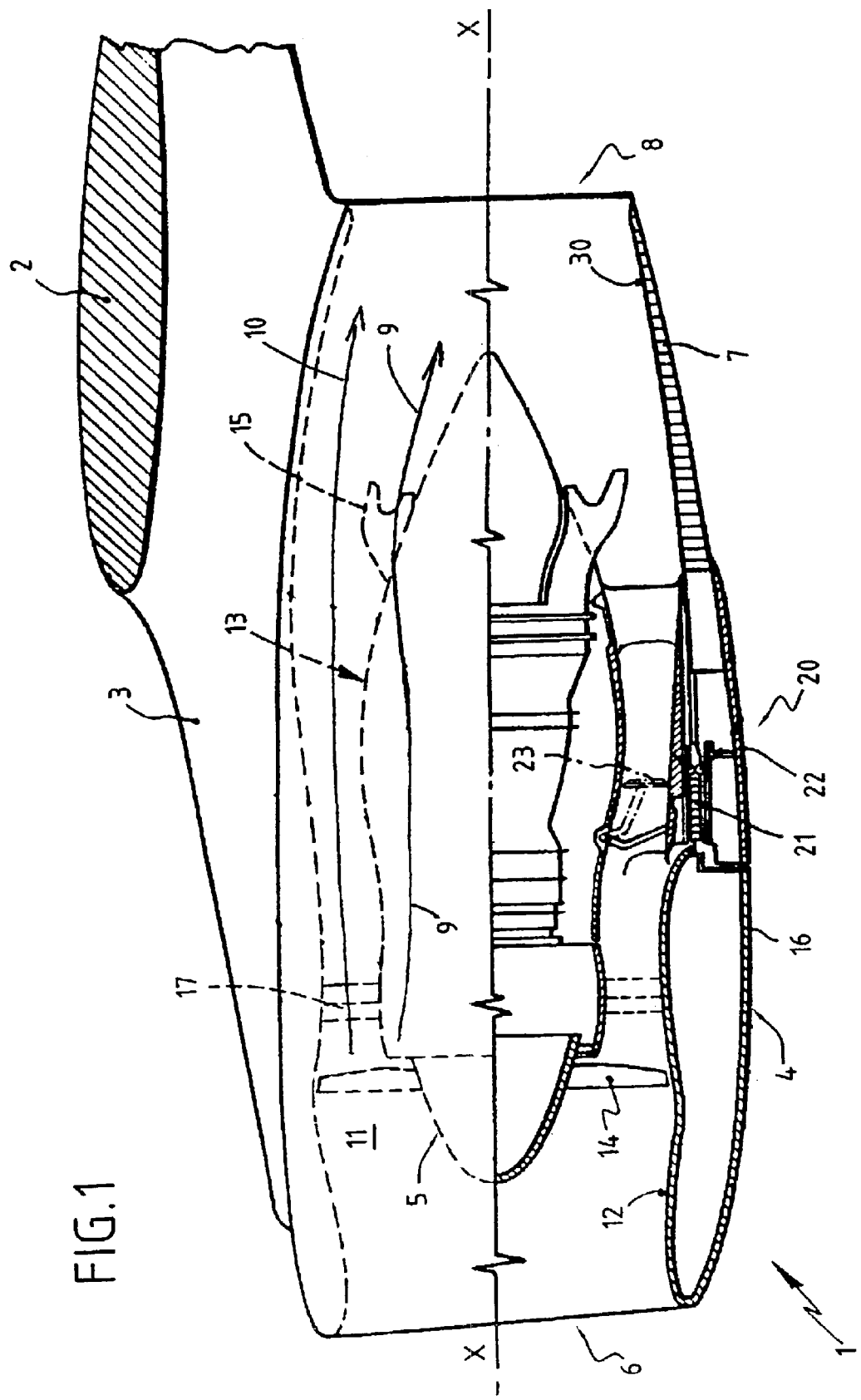
FIG. 1 is a longitudinal section of a dual flow turbojet disposed beneath an aircraft wing in a pod that has a thrust-reverser and a common nozzle for ejecting both the primary and the secondary flows of gas.
Figure 7:
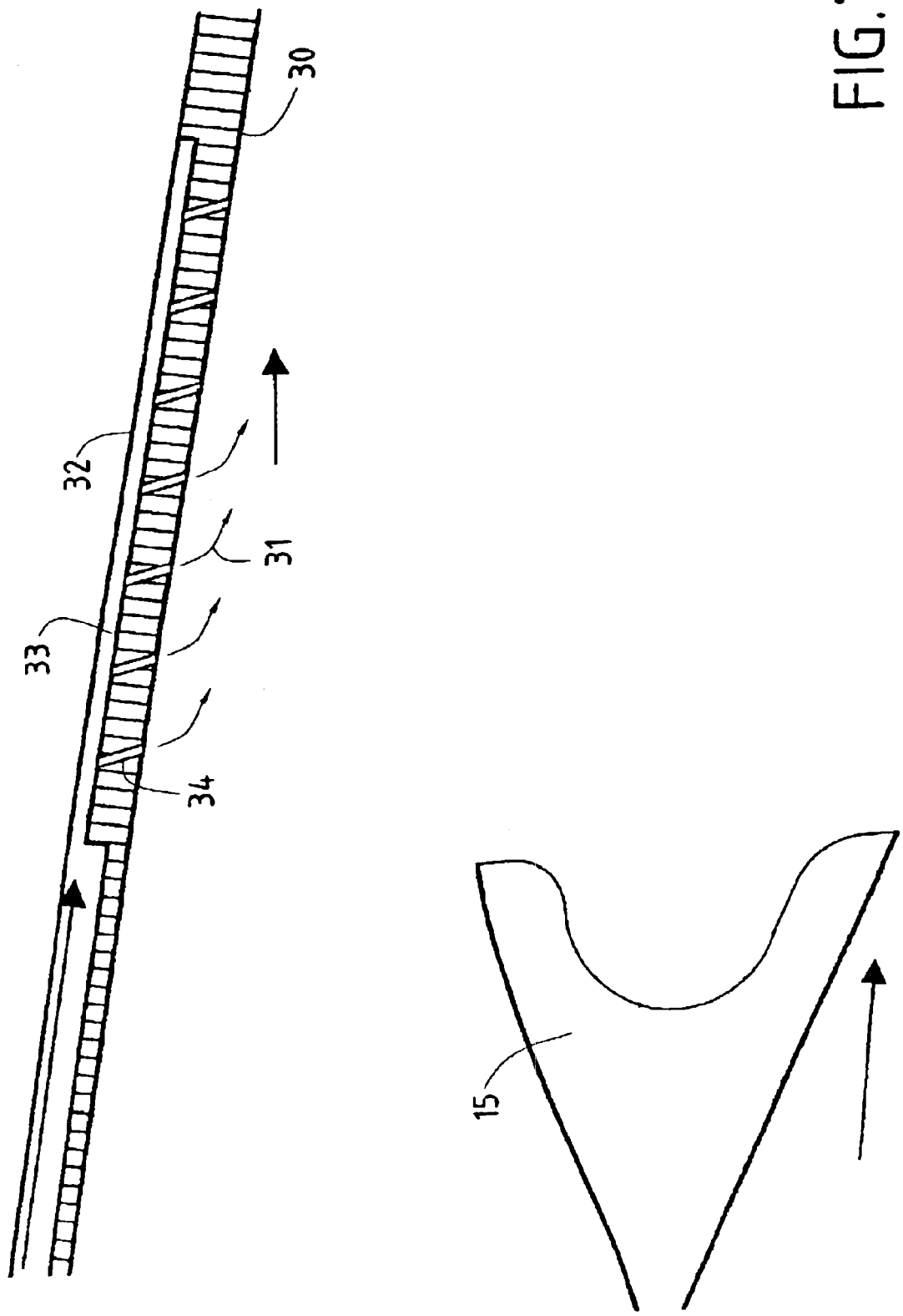
FIG. 7 shows the upstream portion of the nozzle.

FIG. 1 shows a turbojet engine assembly 1 suspended beneath the wing 2 of an airplane via a "mast" structure 3. The assembly 1 comprises a pod 4 that completely surrounds a dual flow turbojet 5 having an axis X. The pod 4 has a front air inlet 6 situated at the upstream end of the engine and a rear ejection nozzle 7 whose outlet 8 is situated at the downstream end of the engine. The nozzle 7 enables the hot primary flow 9 passing through the engine to be ejected together with the cold secondary flow 10 which flows in the annular channel 11 defined between the inside wall 12 of the pod 4 and the case 13 of the engine.

The primary flow 9 follows the usual cycle within the turbojet 5. It is initially compressed by compressors, and it is then used for burning fuel in a combustion chamber. The hot gases coming from the combustion chamber are expanded in a high pressure turbine for driving the compressors, and in a low pressure turbine which drives a fan 14 situated at the front in the annular channel 11, and are then ejected from the rear end of the engine where they are mixed with the cold secondary flow 10 by a mixer device 15 surrounded by the nozzle 7.

From its upstream end to its downstream end, the pod 4 is constituted by four segments, namely: at the front end, the air inlet; followed by a body 16 surrounding the fan 14 and the fixed vanes 17 which straighten out the cold secondary flow 10 delivered by the fan 14; followed by a thrust inverter 20 placed in the middle section of the pod 4; and finally the ejection nozzle 7 for ejecting both the hot primary flow 9 and the cold secondary flow 10.

Figure 9:
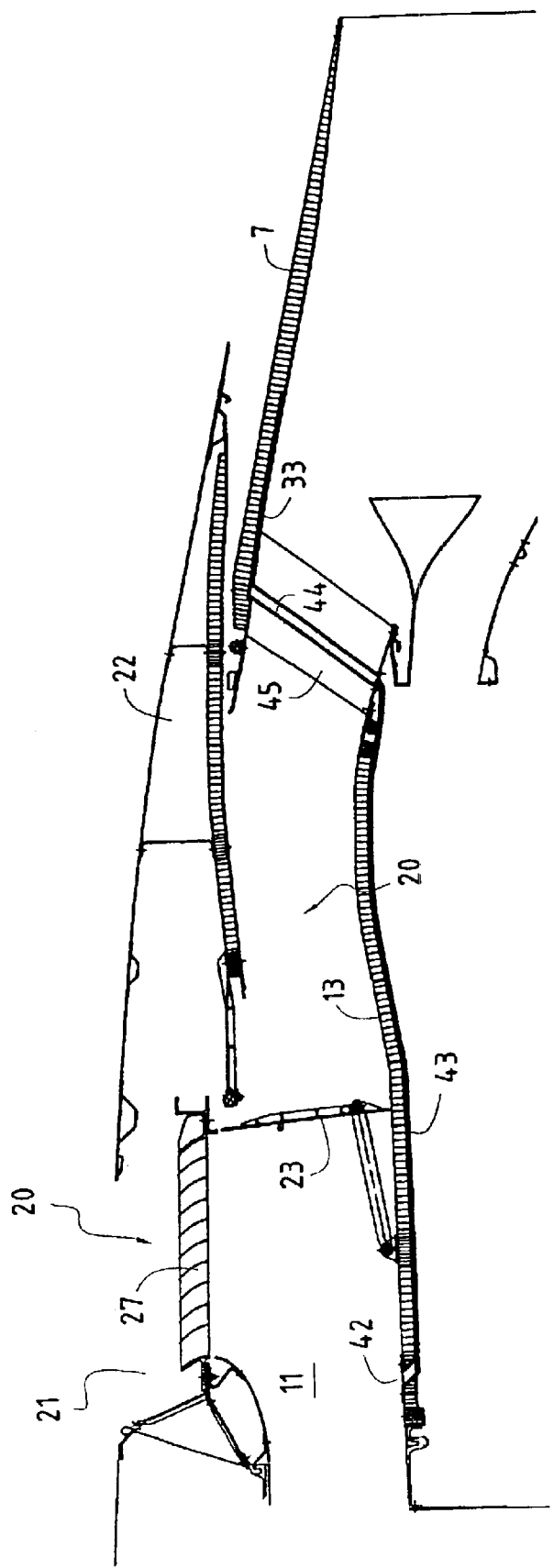
FIG. 9 is a half-section of a turbojet whose pod has a grid reverser, this half-section being taken on the plane of symmetry of an element of said reverser, and its shutters are shown deployed.

The thrust reverser 20 shown in FIGS. 1 and 9 is of the grid type, whereas the reverser shown in FIG. 2 is of the door type. These two types of reverser share in common radial openings 21 made through the wall of the pod 4 and suitable for being closed by moving shutters 22, and means 23 for closing the annular channel 11 behind the radial openings 21.

The radial openings 21 are formed between an annular front frame 24 and an annular rear frame 25 interconnected by longitudinal beams 26, the assembly forming a squirrel cage. When the reverser is of the grid type, the radial openings 21 contain grids 27 for deflecting the secondary flow 10 towards the outside of the pod 4 and towards the front in "reversed jet" mode. The two frames 24 and 25 and the beams 26 are hollow in structure so as to be both rigid and lightweight.

When the thrust reverser 20 is in "forward jet" mode, the annular channel 11 is open and the radial openings 21 are closed by the moving shutters 22 so that the cold secondary flow 10 flows in the annular channel 11 from the front to the back and co-operates with the hot primary flow 10 to provide the thrust of the turbojet 5. Under such circumstances, the nozzle 7 is cooled by the cold flow 10.

When the thrust reverser 20 is in "reversed jet" mode, the radial openings 21 are open and the annular channel 11 is closed, such that the cold secondary flow 10 is directed outwards and forwards from the pod 4 through the lateral openings 21, thereby producing reverse thrust for braking the airplane when running on the ground. In "reversed jet" mode, only the hot primary flow 9 passes through the nozzle 7, thereby heating it. Unfortunately, in order to brake the airplane effectively, it is necessary for the turbojet 5 to deliver power, thereby increasing the intensity and the temperature of the hot primary flow 9.

In the invention, the turbojet assembly 1 has means for forming a film of cold air 31 against the inside wall 30 of the nozzle 7, thereby cooling it and insulating it from the hot primary flow 9, in particular in "reversed jet" mode.

For this purpose, the front region of the nozzle 7 includes an annular enclosure 33 between the inside wall 30 and the outer fairing 32, which enclosure can receive cold air and communicate with the inside of the nozzle 7 downstream from the mixer 15 via a plurality of perforations 34 made through the inside wall 30.

FIGS. 2 to 7 show details of a first embodiment of the invention applied to a door thrust reverser. In this embodiment, the moving shutters 22 are constituted by doors mounted to pivot on two adjacent beams 26 by pivot means 40 in such a manner that in the "reversed jet" position, the downstream portions 23 of the doors 22 close the annular channel 11 and deflect the secondary flow 10 towards the lateral opening 21 and towards the front of the pod 4, as shown in dashed lines in FIG. 3.

The inside face 41 of the door 22 is fitted with a scoop 42 of a configuration such that when in the "inverted jet" position it bleeds off a flow of cold air sufficient to cool the nozzle 7. This flow of air is conveyed towards the annular enclosure 33 of the nozzle 7 by a flexible duct 43 which has one end opening out into the internal cavity of the scoop 42, which passes through a bore 44 provided in a pivot 40, runs a certain length in the internal cavity in the corresponding longitudinal beam 26, and opens out via its opposite end into the annular enclosure 33 of the nozzle 7.

Figure 8:
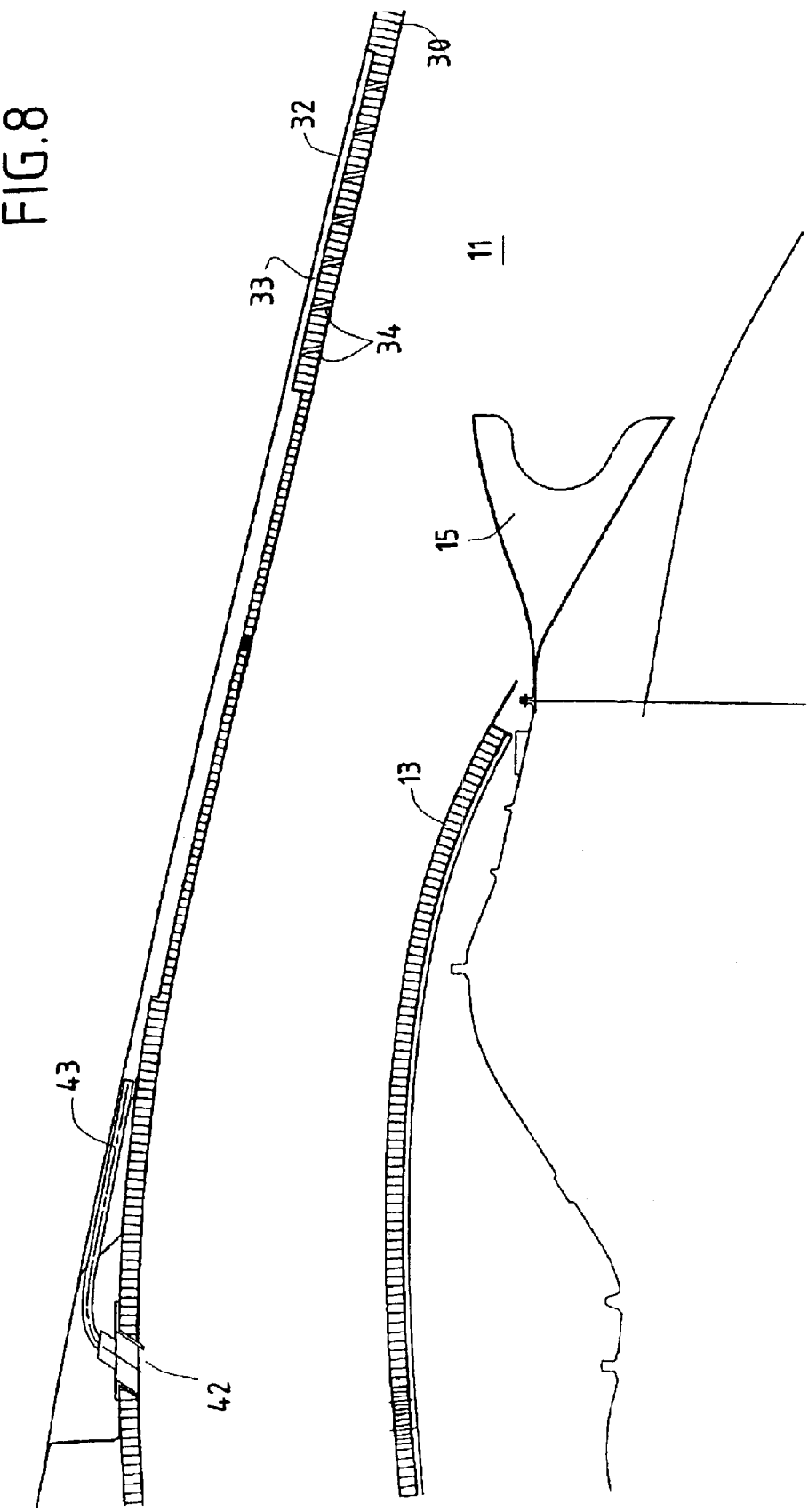
FIG. 8 is a longitudinal half-section of the FIG. 2 turbojet in the plane of symmetry of a door, and it shows a second embodiment of the invention.

FIG. 8 shows a second embodiment of the invention applied to a door thrust reverser 20. In this case, the scoop 42 is provided on the inside face of a beam 26 upstream from the rear portions 23 of the doors when in the "reversed jet" position. The air bled off by the scoop 42 is taken to the enclosure 33 of the nozzle 7 via a duct 43 which, in this embodiment, need not be flexible.

Figure 10:
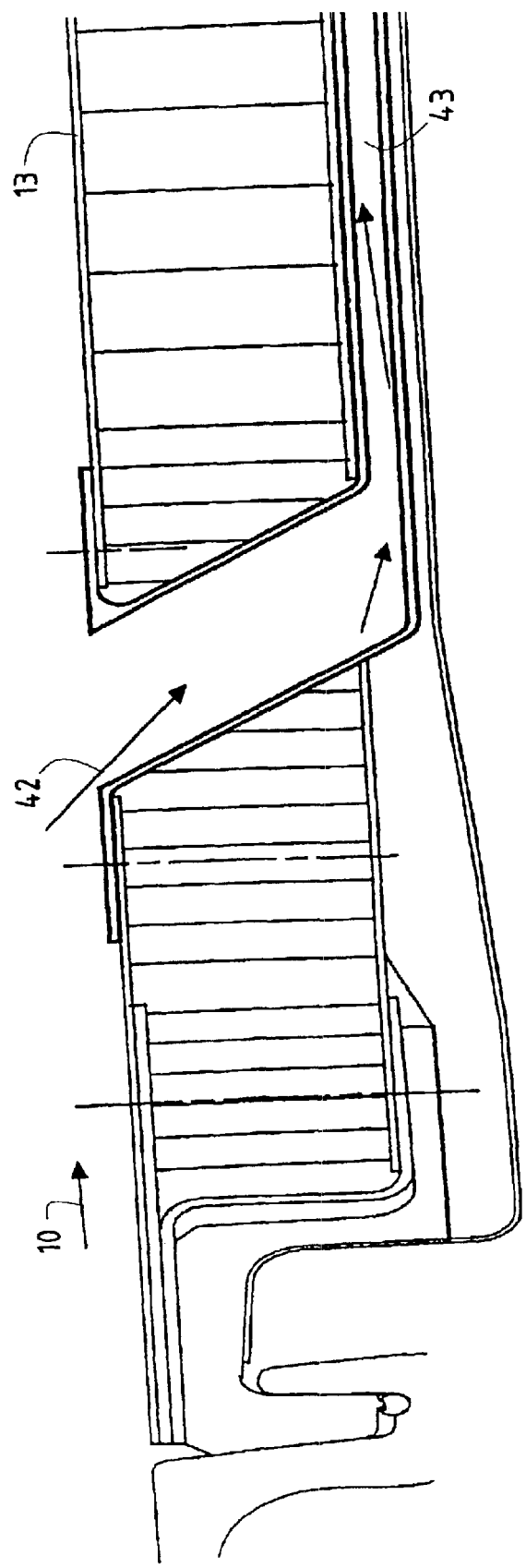
FIG. 10 is on a larger scale than FIG. 9 and shows the facility of the scoop in the engine case of the FIG. 9 turbojet.
Figure 11:
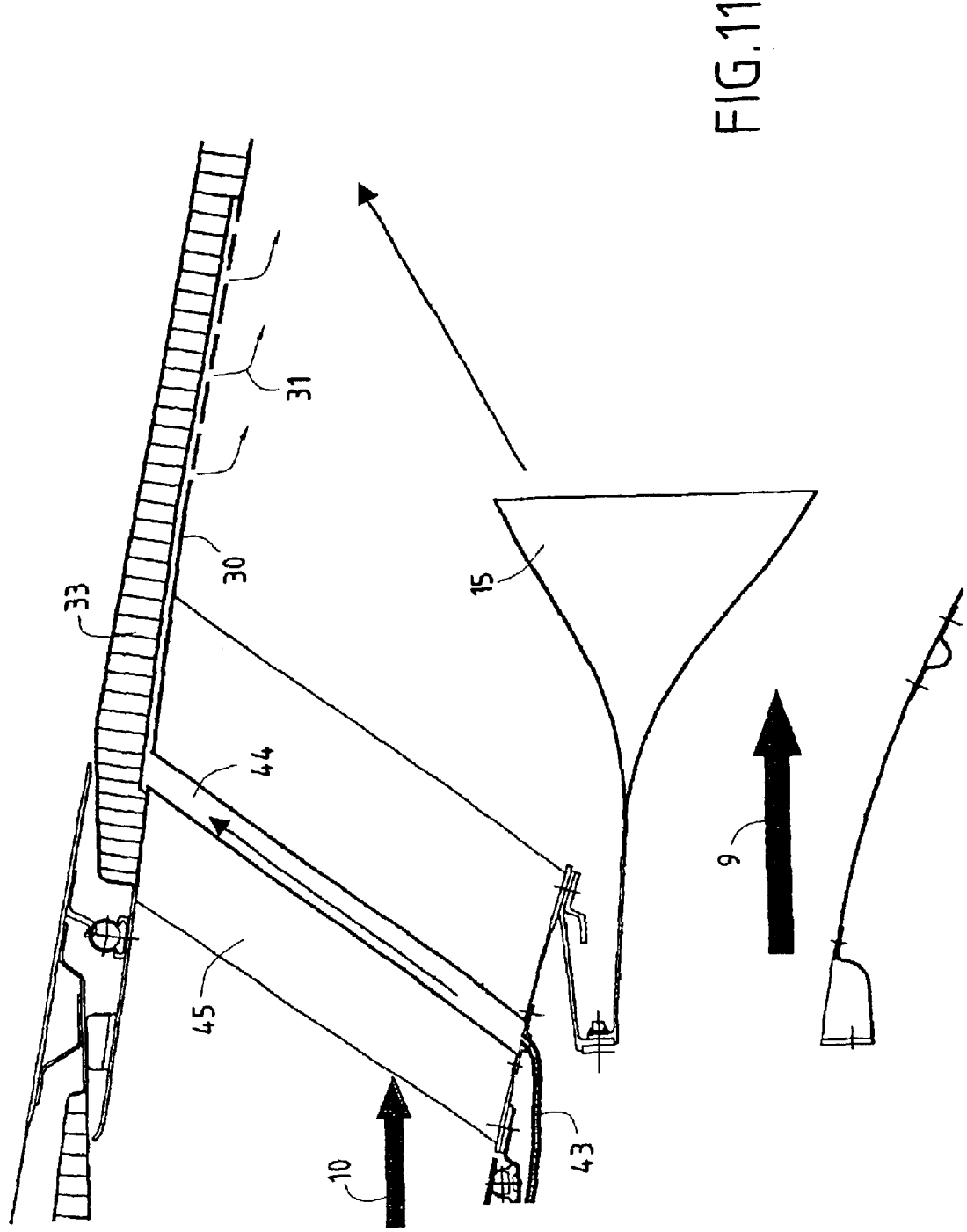
FIG. 11 shows on a larger scale the circuit for bled-off air through the support arms of the nozzle of the FIG. 9 turbojet.

FIGS. 9 to 11 show details of an embodiment of the invention applied to a grid type thrust reverser 20. The flow of cooling air for the nozzle 7 is bled from the secondary flow 10 by means of a scoop 42 provided in the case 13 of the turbojet 5 upstream from flaps 23 which deflect the secondary flow 10 when they are in the deployed position, and said air is taken to the enclosure 33 of the nozzle 7 by a duct 43 placed in the case 13 and via a duct 44 provided in a radial arm 45 connecting the nozzle 7 to the engine case 13.

Figure 12:
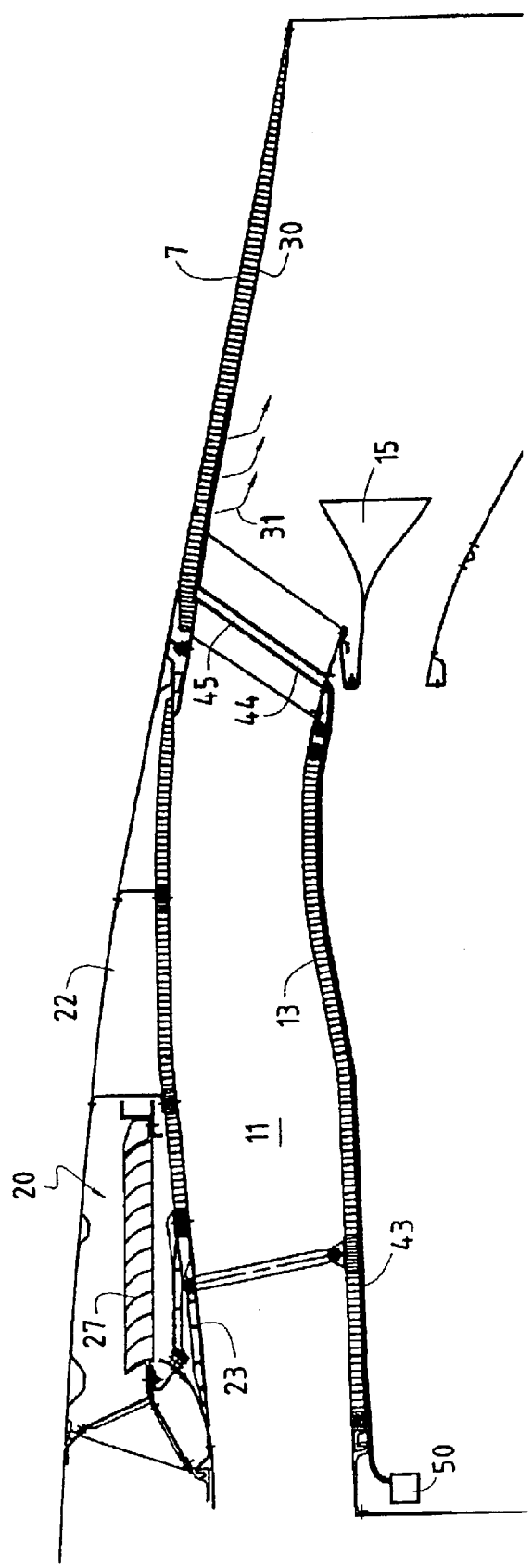
FIG. 12 is a half-section of a turbojet whose pod includes a grid reverser and in which cooling air for the nozzle is bled from the device for controlling turbine clearance.

FIG. 12 shows another embodiment of the invention applied to a grid thrust reverser 20. In this embodiment, the flow of cold air for the nozzle 7 is bled from the engine via a valve 50 for regulating the device for controlling turbine clearance and, as in the preceding embodiment, the means for taking the bled-off flow of air to the enclosure 33 of the nozzle comprise a duct 43 placed inside the case and a duct 44 formed in a radial arm 45 connecting the nozzle 7 to the engine case 13. The air feeding the clearance control device is taken from the cold flow upstream of the thrust-reverser means, thereby ensuring good cooling air flow in the nozzle in "reversed jet" mode because of the pressure difference between the upstream and downstream sides of the thrust-reverser means in this mode of operation.

What is claimed is:

1. A dual flow turbojet comprising an engine of axis X housed completely inside a tubular pod whose inside wall co-operates with the case of said engine to define an annular passage for a secondary flow delivered by a fan, said pod having an air inlet upstream of the engine, thrust-reverser means in its middle section, and a common nozzle for ejecting both the primary flow and the secondary flow, the outlet of the nozzle being situated downstream from the engine, said thrust-reverser means being suitable for taking up an active position in which the secondary flow is diverted outwards and forwards from said pod, said nozzle having an enclosure defined by the inside and outside walls of said nozzle, the turbojet further comprising cooling means for cooling the nozzle when the thrust-reverser means are in the active position, said cooling means comprising means for bleeding a flow of cooling air from the secondary flow upstream from the thrust-reverser means, means for taking the bled-off flow of air into the enclosure of said nozzle, and means for forming a film of cooling air on the inside face of said nozzle.

2. A turbojet according to claim 1, wherein the means for forming a film of air on the inside face of said nozzle comprise multiple perforations formed through the inside wall of said nozzle.

3. A turbojet according to claim 1, wherein the flow of cooling air is bled from the secondary flow by means of at least one scoop.

4. A turbojet according to claim 3, wherein the thrust-reverser means include at least one door mounted to tilt on longitudinal beams of the pod by means of support pivots.

5. A turbojet according to claim 4, wherein the scoop is provided on the inside face of the door, and the means for bringing the bled-off flow of air into the enclosure of the nozzle comprise a duct connecting the scoop to said enclosure via a bore provided axially in a support pivot of said door.

6. A turbojet according to claim 4, wherein the scoop is provided on the inside face of a longitudinal beam upstream from the support pivot, and the means for bringing the bled-off flow of air into the enclosure of the nozzle comprise a duct connecting the scoop to said enclosure.

7. A turbojet according to claim 3, wherein the thrust-reverser means comprise fixed grids suitable for being masked by axially movable shutters, and tilting flaps suitable for deflecting the secondary flow towards the grids when in the deployed position, the scoop is provided on the engine case upstream from the flaps when in the deployed position, and the means for bringing the bled-off flow of air into the enclosure of the nozzle comprise a duct connecting the scoop to said enclosure via a radial arm connecting the nozzle to the engine case.

8. A turbojet according to claim 2, wherein the flow of cooling air is bled from the engine at a valve for regulating the device for controlling turbine clearance, and the means for bringing the bled-off flow of air into the enclosure of the nozzle comprise a duct connecting said valve to said enclosure via a radial arm connecting the nozzle to the engine case.

* * * * *